United States Patent
Schroder et al.

(10) Patent No.: US 11,144,972 B2
(45) Date of Patent: Oct. 12, 2021

(54) METHODS AND SYSTEMS RELATED TO CALCULATING EQUPMENT CONSUMPTION RATES FOR POWER PLANT MAINTENANCE AND SERVICE

(71) Applicant: General Electric Company, Schenectady, NY (US)

(72) Inventors: Mark Stewart Schroder, Greenville, SC (US); Jeffrey Richard Lucas, Brookhaven, GA (US); Sergey Anatolyevich Tikhonovsky, Marietta, GA (US)

(73) Assignee: General Electric Company, Schenectady, NY (US)

( * ) Notice: Subject to any disclaimer, the term of this patent is extended or adjusted under 35 U.S.C. 154(b) by 789 days.

(21) Appl. No.: 15/856,116

(22) Filed: Dec. 28, 2017

(65) Prior Publication Data

US 2019/0205952 A1 Jul. 4, 2019

(51) Int. Cl.
*G06Q 30/02* (2012.01)
*G06Q 10/00* (2012.01)
*G06Q 30/04* (2012.01)

(52) U.S. Cl.
CPC ......... *G06Q 30/0283* (2013.01); *G06Q 10/20* (2013.01); *G06Q 30/0206* (2013.01); *G06Q 30/04* (2013.01)

(58) Field of Classification Search
CPC ............... G06Q 30/0283; G06Q 10/20; G06Q 30/0206; G06Q 30/04
See application file for complete search history.

(56) References Cited

U.S. PATENT DOCUMENTS

| | | |
|---|---|---|
| 7,225,168 B2 | 5/2007 | Grass et al. |
| 7,269,569 B2 | 9/2007 | Spira et al. |
| 2001/0032109 A1 | 10/2001 | Gonyea et al. |
| 2002/0072333 A1 | 6/2002 | Gnesda et al. |
| 2004/0230455 A1 | 11/2004 | McKinney et al. |
| 2006/0143265 A1 | 1/2006 | Ferrari et al. |
| 2010/0057480 A1 | 3/2010 | Arfin et al. |
| 2014/0033679 A1 | 2/2014 | Sarsen et al. |

(Continued)

OTHER PUBLICATIONS

A System for Continuously Monitoring the Consumption of Energy for the Auxiliaries of a T-250 Power-Generating Unit Published by Original Russian Text (Year: 2006).*

(Continued)

*Primary Examiner* — Zeina Elchanti
(74) *Attorney, Agent, or Firm* — Hoffman Warnick LLC

(57) ABSTRACT

A method relating to pricing under a contractual service agreement between a customer and a service provider, where the service provider provides maintenance services on a generating unit for a fee. An output of the generating unit is produced by a generator to which the generating unit is operably connected. The method comprising: determining a usage period for the generating unit; monitoring the output of the generating unit during the usage period and, therefrom, designating an output level for the generating unit for the usage period; calculating the fee for the usage period pursuant to a variable pricing plan, the variable pricing plan comprising a price for calculating the fee that varies depending on the designated output level of generating unit for the usage period; and billing the calculated fee to the customer.

12 Claims, 6 Drawing Sheets

(56) References Cited

U.S. PATENT DOCUMENTS

| | | | | |
|---|---|---|---|---|
| 2015/0309547 A1* | 10/2015 | Huang | ................... | G06F 1/263 307/80 |
| 2016/0119739 A1* | 4/2016 | Hampel | ................. | H04W 4/38 370/315 |
| 2016/0156188 A1* | 6/2016 | Baba | ..................... | G05B 15/02 700/296 |
| 2016/0196622 A1* | 7/2016 | Tokunaga | .............. | G06Q 30/06 705/7.25 |
| 2017/0366628 A1* | 12/2017 | Devkar | .................. | H04L 51/32 |

OTHER PUBLICATIONS

European Search Report and Written Opinion dated Apr. 4, 2019 for EP Application 18213768.7; pp. 8.

\* cited by examiner

METHODS AND SYSTEMS RELATED TO CALCULATING EQUPMENT CONSUMPTION RATES FOR POWER PLANT MAINTENANCE AND SERVICE

BACKGROUND OF THE INVENTION

The invention of the present application relates generally to the power generation industry and, more particularly, to variable pricing methods and systems that align economic objectives of service provider and customer in long-term service contracts relating to power plant operation and maintenance.

In electric power systems, participant power plants generate electricity that is distributed over common transmission lines to residential and commercial customers. As will be appreciated, thermal generating units, such as gas turbines, steam turbines, and combined-cycle plants, are relied on to generate a significant portion of the power consumers and industry require. Each of the power plants within such power systems generally include one or more power generating units, and each of these units typically includes a control system that controls operation, and, in the case of power plants having more than one generating unit, the performance of the power plant as a whole. As an example, one of the responsibilities of a plant operator or manager includes generating an offer curve representing the cost of power production for the plant. An offer curve typically includes an incremental variable cost curve, an average variable cost curve, or another suitable indication of variable power generating expense, which typically is expressed in dollars per megawatt-hour versus output in megawatts. It will be appreciated that an average variable cost curve may represent a cumulative cost divided by a cumulative power output for a given point, and an incremental variable cost curve may represent a change in cost divided by a change in power output.

In most power systems, a competitive process commonly referred to as economic dispatch is used to divide the power grid's system load over a future time period among the participant power plants. As part of this process, power plants periodically generate offer curves and send those offer curves to a power system authority or dispatcher. Such offer curves represent bids from the power plants to generate a portion of the electricity required by the power system over a future market period. The dispatch authority receives the offer curves from the power plants within its system and evaluates them to determine the level at which to engage each power plant so to most efficiently satisfy the predicted load requirements of the system. In doing this, the dispatch authority analyzes the offer curves and, with the objective of finding the lowest generating cost for the system, produces a commitment schedule that describes the extent to which each of the power plants will be engaged over the relevant period.

The power generating companies that operate the power plants often delegate the operation and maintenance of plants to equipment manufacturers or other service companies (or "service providers"). This approach may increase profitability and/or decrease risks associated with unexpected operation and maintenance expenditures. Typically, such contractual service agreements (or "CSAs"), provide the power generating companies (or "customers") with certain guarantees, including availability, reliability, maintenance costs, power output, heat rate, and so forth, for an extended time period, for example, one or more years. Further, the terms of such service agreements may be varied, including specified routine and emergency maintenance procedures and frequency thereof as well as guarantees around plant performance and against outages and other plant failures.

Through the use of different factoring mechanisms, conventional service agreements for power plants having gas and steam turbines typically attempt to quantify a consumption rate of the equipment covered under the agreement, with this estimated consumption rate being tied to payments due to the service provider. These factoring mechanisms—which may include so called "factored fired hours" or "equivalent operating hours"—essentially count the hours that the covered engines are operated, and use the accumulated hours to indicate how much of the equipment associated with the engines has been "consumed" from the initial condition of the equipment at the beginning of the contract term. However, because these "counters" are defined independent of the load being generated by the engines, service agreements of this type usually result in inequities over the term of the agreement, which operates to the service provider's advantage, particularly in relation to how part load operation is counted. Further, these types of agreements result in inefficient plant operation and bidding practices, which, as will be shown, is economically detrimental not only to power plant customer, but also to the service providers. As a result, systems and methods related to variable pricing structures in such service agreements that equitably aligns billing with hardware life consumption and the economic interests of the customers with the service providers—as well as systems and methods related to the efficient monitoring and executing of such pricing structures—would have significant utility in the industry.

BRIEF DESCRIPTION OF THE INVENTION

The present application thus describes a method relating to pricing under a contractual service agreement between a customer and a service provider, where the service provider provides maintenance services on a generating unit for a fee. An output of the generating unit is produced by a generator to which the generating unit is operably connected. The method comprising: determining a usage period for the generating unit; monitoring the output of the generating unit during the usage period and, therefrom, designating an output level for the generating unit for the usage period; calculating the fee for the usage period pursuant to a variable pricing plan, the variable pricing plan comprising a price for calculating the fee that varies depending on the designated output level of generating unit for the usage period; and billing the calculated fee to the customer.

These and other features of the present application will become more apparent upon review of the following detailed description of the preferred embodiments when taken in conjunction with the drawings and the appended claims.

DETAILED DESCRIPTION OF THE INVENTION

Example embodiments of the invention will be described more fully hereinafter with reference to the accompanying drawings, in which some, but not all embodiments are shown. Indeed, the invention may be embodied in many different forms and should not be construed as limited to the embodiments set forth herein; rather, these embodiments are provided so that this disclosure will satisfy applicable legal requirements. Like numbers may refer to like elements throughout.

Figure 1:
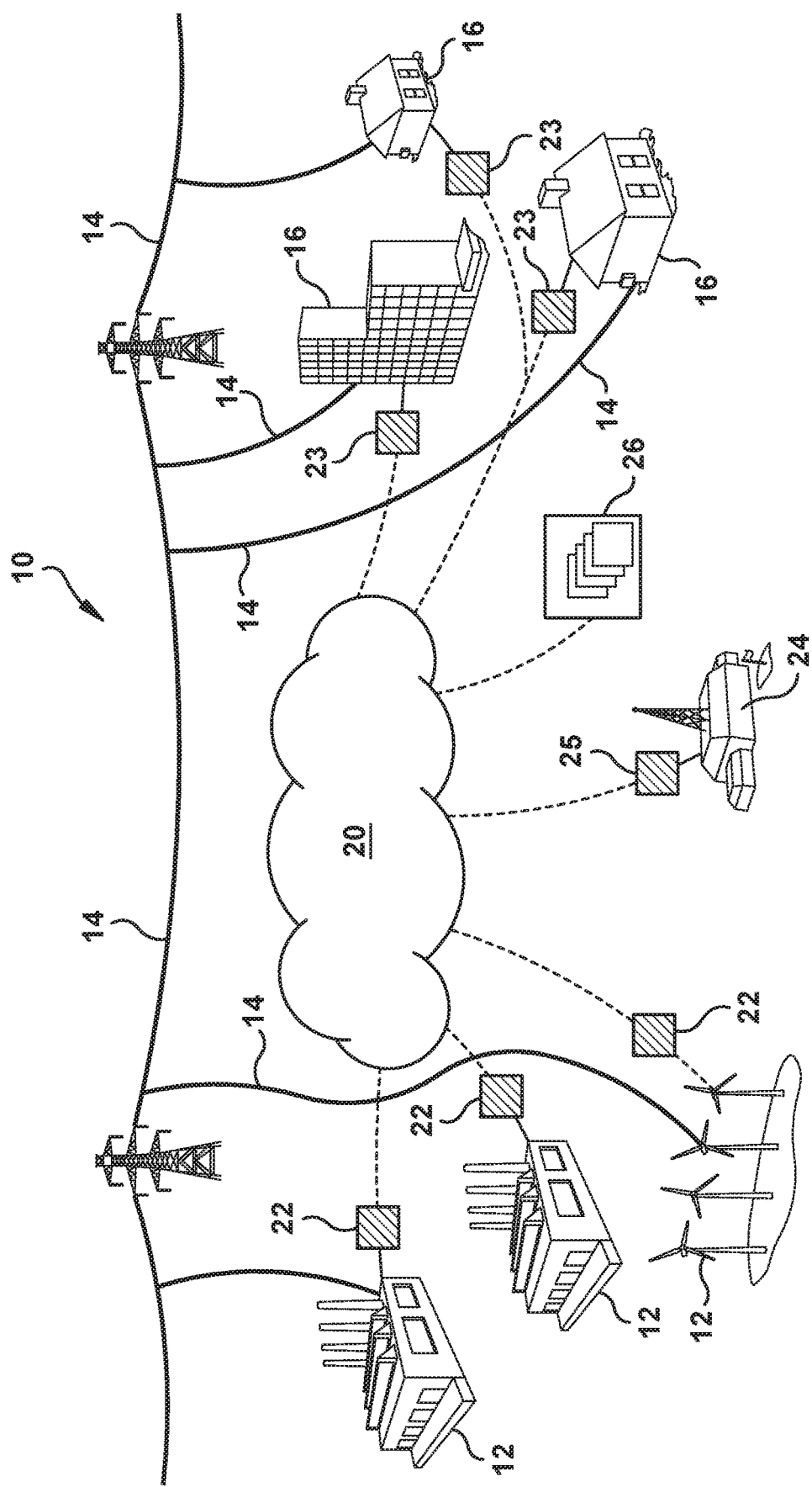
FIG. 1 shows a schematic diagram of a power system according to aspects of the present invention or within which embodiments of the present invention may be used.

FIG. 1 illustrates a schematic representation of a power system 10 that includes aspects of the present invention as well as an exemplary environment in which embodiments may operate. Power system 10 may include power generators or plants 12, such as, for example, the illustrated wind and thermal power plants. In the case of thermal power plants, for example, the generating units may include gas turbines, coal-fired steam turbines, and/or combined-cycle plants. In addition, power system 10 may include other types of power plants, such as solar power installations, hydroelectric, geothermal, nuclear, wind, fuel cell, reciprocating engine, energy storage and/or any other suitable power sources now known or discovered hereafter and any combination of said systems. Transmission lines 14 may connect the various power plants 12 to customers or loads 16 of power system 10. It should be understood that transmission lines 14 represent a grid or distribution network for the power system and may include multiple sections and/or substations as may be desired or appropriate. The power generated from power plants 12 may be delivered via transmission lines 14 to loads 16, which, for example, may include municipalities, residential, or commercial and industrial customers.

Power system 10 also includes control systems or controllers 22, 23, 25 that manage or control the operation of several of the components contained therein. For example, a plant controller 22 may control the operation of each of the power plants 12. Load controllers 23 may control the operation of the different loads 16 that are part of the power system 10. For example, a load controller 23 may manage the manner or timing of a customer's power purchase. A dispatch authority 24 may manage certain aspects of the operation of power system 10, and may include a power system controller 25 that controls the economic dispatch procedure by which load commitments are distributed among participating power plants. Controllers 22, 23, 25, which are represented by rectangular blocks, may be connected via communication lines to communication network 20 over which data is exchanged, where such connections may be wired or wireless. It will be appreciated that communication network 20 may be connected to or part of a larger communications system or network, such as the interne or a private computer network. In addition, the controllers 22, 23, 25 may receive information, data, and instructions from and/or send information, data, and instructions to data libraries and resources, which may be referred to herein generally as "data resources 26", through communication network 20, or, alternatively, may store or house one or more such data repositories locally. Data resources 26 may include several types of data, including but not limited to: market data, operating data, and ambient conditions data.

In electric power systems, such as exemplary power system 10, a number of participant power plants generate electricity that is then distributed over common transmission lines to residential and commercial customers. As will be appreciated, thermal generating units, such as gas turbines, steam turbines, and combined-cycle plants and distributed generation, are relied on to generate a significant portion of the power consumers and industry require. Each of the power plants within such systems may include one or more power generating units, and each of these units typically includes a control system that controls operation, and, in the case of power plants having more than one generating unit, the performance of the power plant as a whole. As an example, one of the responsibilities of a plant operator is the generation of an offer curve representing the cost of power production. An offer curve typically includes an incremental variable cost curve, an average variable cost curve, or another suitable indication of variable power generating expense, which typically is expressed in dollars per megawatt-hour versus output in megawatts. It will be appreciated that an average variable cost curve may represent a cumulative cost divided by a cumulative power output for a given point, and an incremental variable cost curve may represent a change in cost divided by a change in power output. An incremental variable cost curve may be obtained, for example, by taking a first derivative of an input-output curve of the power plant that represents cost per hour versus power generated.

In most power systems, a competitive process commonly referred to as economic dispatch is used to divide the power grid's system load among power plants over a future operating period. As part of this process, power plants periodically generate offer curves and send those offer curves to a power system authority or dispatcher. Such offer curves represent bids from the power plants to generate a portion of the electricity required by the power system over a future market period. The dispatch authority receives the offer curves from the power plants within its system and evaluates them to determine the level at which to engage each power plant so to most efficiently satisfy the predicted load requirements of the system. In doing this, the dispatch authority analyzes the offer curves and, with the objective of finding the lowest generating cost for the system, produces a commitment schedule that describes the extent to which each of the power plants will be engaged over the relevant time period.

Figure 2:
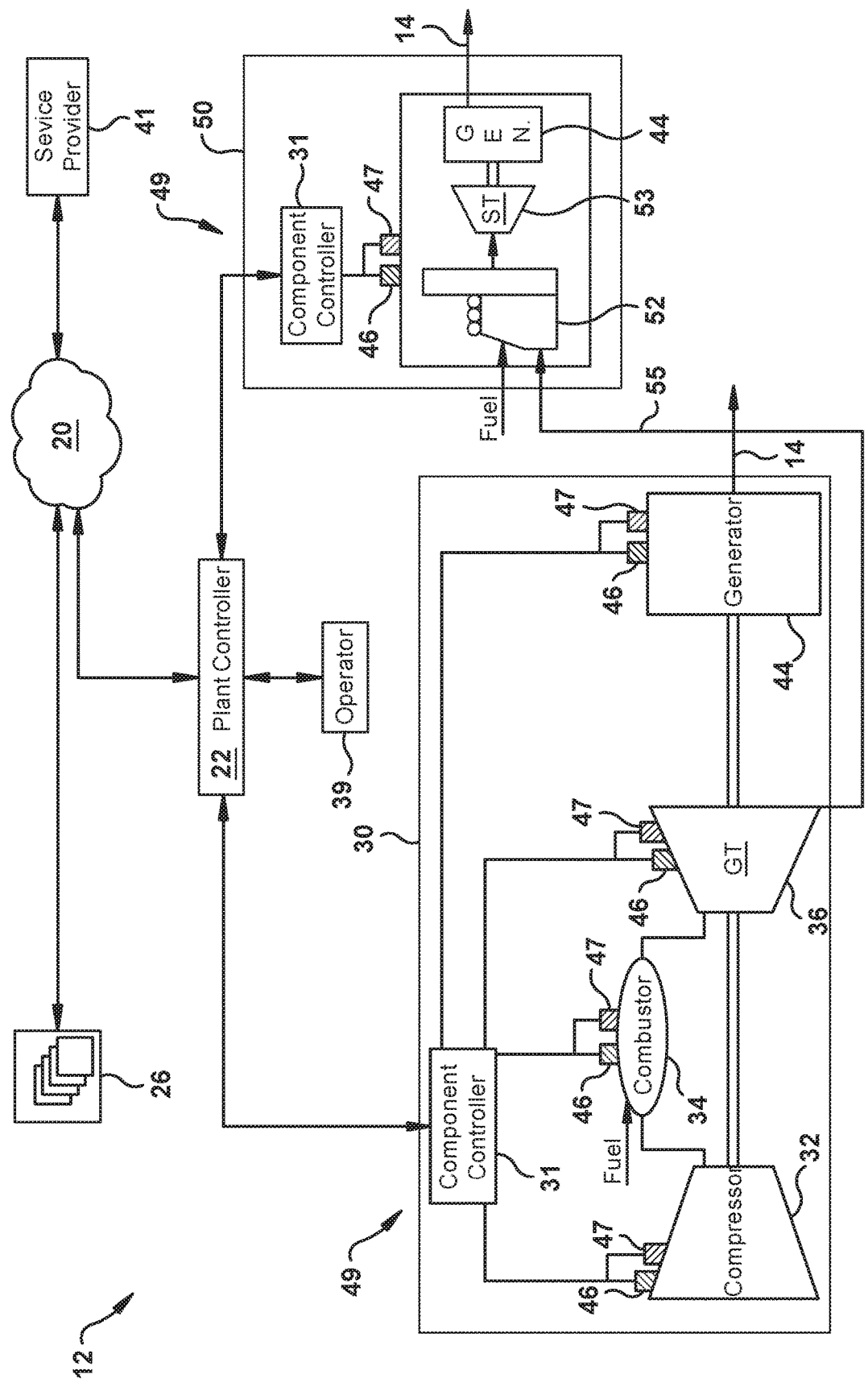
FIG. 2 shows a schematic diagram of an exemplary combined cycle power plant in accordance with embodiments of the present invention.

Turning to FIG. 2, a schematic diagram is provided of an exemplary thermal power plant 12 having a plurality of generating units or plant components 49. The illustrated power plant 12 represents a common configuration for a thermal power plant, and thus will be used to discuss exemplary embodiments of the present invention. However, is should be appreciated that the present invention may be more generally applicable to any type of power generating unit, as well as scalable to power plants having more generating units than those shown in FIG. 2. It will be appreciated that the exemplary power plant 12 of FIG. 2 is a combined-cycle plant that has several plant components 49, including a gas turbine system 30 and a steam turbine system 50. Power generation may be augmented by other plant components 49, for example, with a duct firing system 52. It will be appreciated that each of the gas turbine system 30 and the steam turbine system 50 includes a control system (or "component controller") 31 that communicates electronically with sensors 46 and actuators 47, which are dedicated to each plant component 49. The power plant of FIG. 2 may include a plant controller 22 that connects with each of the component controllers 31 and, via these connections, communicates with the sensors 46 and actuators 47 of the several plant components 49 and controls the power plant 12 subject to instructions received from an owner or operator 39. As discussed more below, the power plant 12 and/or operator 39 may represent the "customer" in relation to contractual service agreements, where the service provider 41 provides the operation and maintenance services to the power plant 12 pursuant to such an agreement.

By way of background, the gas turbine system 30 operates by extracting energy from a pressurized flow of hot gas produced by the combustion of fuel in a stream of compressed air. The gas turbine system 30 includes a compressor 32 that is coupled by a common shaft to a downstream turbine section or turbine 36, with a combustor 34 being positioned therebetween. In one example of operation, the rotation of rotor blades within the compressor 32 compresses a flow of air. In the combustor 34, energy is released when the compressed air is mixed with a fuel and ignited. The resulting flow of hot gases or "working fluid" from the combustor 34 is then directed over rotor blades within the turbine 36, which induces the shaft to rotate. In this way, the energy of the flow of working fluid is transformed into the mechanical energy of the rotating shaft, which then, for example, may be used to drive the coils of a generator 44 to produce electricity. The generated electricity may then be delivered via the transmission lines 14 to the power system 10.

The steam turbine system 50, as illustrated, includes a steam turbine 53 and duct firing system 52, as well as a component controller 31 that is dedicated to its control. In general, the steam turbine system 50 uses the heat of the exhaust gases 55 from the gas turbine to produce steam and then expands that steam through the steam turbine 53. As will be appreciated, the duct firing system 52 may be used to provide additional energy to the exhaust flow 55 so to produce more steam and, thereby, increase the generating capacity of the steam 50. Within the steam turbine 53, the energy of the steam flow is transformed into the mechanical energy of a rotating shaft, which then may be used to drive a generator 44 so to generate electricity. The electricity generated may then be delivered via the transmission lines 14 to the power system 10. Among other things, the component controller 31 of the steam turbine system 50 may set the flow rate of fuel burned within the duct firing system 52. The component controller 31 of the steam turbine system 50 may send data regarding its operation and receive therefrom instruction as to how it should operate.

It is desirable for modern generating plants, such as the exemplary combined cycle power plant of FIG. 2, to achieve high levels of availability, reliability, and performance, thereby providing owners and operators with high operating revenues, low fuel costs, and enhanced dispatch competitiveness. The availability of a power plant can be improved through increasing the reliability of individual assets with a robust maintenance program and recovering performance degradation through remote efficiency monitoring and timely corrective measures.

Using long-term contractual service agreements, or "CSAs", power generating companies that own such power plants—which may be referred to herein as "customers"—often delegate the operation and maintenance to equipment manufacturers or other service companies—which may be referred to herein as "service providers". This approach may be used to increase profitability and/or decrease risks associated with operation and maintenance. Typically, CSAs provide customers with certain guarantees, including availability, reliability, maintenance costs, power output, heat rate, and so forth, for an extended period of time, for example, one or more years. The terms of such service agreements may be varied, including specified routine and emergency maintenance procedures and the frequency thereof, as well as guarantees around plant performance and against outages and other plant failures. The present invention includes systems and methods related to variable pricing structures of CSAs, as well as systems and methods related to the efficient monitoring and execution of such variable pricing arrangements. As will be seen, the variable pricing structures of the present invention may be used to more equitably equate billing with hardware life consumption and, thereby, align more closely the economic interests of the customer and the service provider. In this way, inefficiencies in the bidding process may be avoided that are economically detrimental to both parties.

Furthermore, CSAs may be used to efficiently integrate the service provider's technical knowledge, remote monitoring and diagnostics tools, and extensive fleet management experience with field service, parts, and repairs. In this manner, CSAs may protect customer assets, maximize operational productivity, and minimize costs. These contracts typically stipulate certain unit performance requirements to be guaranteed by the service provider via a monetized incentive program, such as, for example, bonuses and liquidated damages. Both remote real-time plant performance monitoring and routine asset performance tests on site can serve to enable a systematic approach to plant and unit performance optimization.

While there are different types of CSAs and ways in which such agreements may be structured, several terms are common to most agreements and will be referred to as provided below. Thus, as used herein, the "equipment" of a CSA is the power plant engines, systems, subsystems, hardware, components, and/or parts that are defined within the agreement as being covered thereby. The "equipment", for example, may include several gas or steam turbines and the subsystems and subcomponents or parts related thereto. Additionally, CSAs typically include a payment schedule or payment factoring mechanism by which is calculated an amount payable to the service provider for the use of equipment (and maintenance and service costs related to that usage) within a defined billing or usage period. As will be appreciated, the payment schedule or factoring mechanism generally represents an attempt by the parties to define and schedule payments to the service provider based on the rate at which the equipment covered under the agreement is "consumed" by usage within the predetermined time frame or, as used herein, "usage period". According to some agreements, a payment schedule is used in which a fixed amount becomes due the service provider at the end of each billing or usage period, which, for example, may be defined biweekly, monthly, etc. As will be appreciated, under this type of approach, the parties to the agreement are essentially assuming a flat rate of the consumption for the covered equipment over the course of each billing or usage period for the term of the agreement. That is, the assumption is that the rate of equipment consumption does not vary from day to day, week to week, or month to month. In such cases, the amount owed to the service provider is independent of the manner the equipment was used during the usage period.

Rather than a fixed amount, most agreements include a payment schedule that varies in accordance with an hourly-based factoring mechanism, where such factoring mechanism is used to determine the amount owed to the service provider based upon the number of hours the equipment was used during the defined usage period. Through the use of such factoring mechanisms, conventional service agreements generally quantify how much of the equipment was "consumed" during the usage period based on a count of the hours that the equipment was "fired" or used. This hourly-based consumption rate is then tied to the amount owed to the service provider for that usage period. For example, conventional factoring mechanisms—such as the so called "factored fired hours" or "equivalent operating hours"—essentially count the number of hours that the covered equipment is running or being operated during the usage period, and then uses the accumulated number of hours to calculate how much of the equipment had been consumed.

As will be appreciated, simply counting hours of usage in this way results in equipment consumption rate being estimated without regard to the power output or load level that was being generated by the equipment during those hours of use. This type of approach, thus, results in part load generating levels being more expensive to generate on a per MWh basis. Indeed, as the part load drops further below the full load level for the generating unit, the generating cost increasingly becomes more expensive on a per MWh basis. Because this increasingly more expensive part load maintenance and service cost is reflected in the bids submitted by plant operators during the dispatch process, power plants are often priced out of many part load generating opportunities. For this reason, conventional CSAs that "count" hours in this way not only result in inequities over the term of the agreement, but also discourage part load generating opportunities. This is particularly true in relation to how hours of part load operation are counted against the customer so to actually increase maintenance and service costs relating to part load generating conditions. Significantly, this results in inefficient plant operation and bidding practices, which are economically detrimental not only to customers, but, as will be seen, also to the long-term interests of the service providers.

While conventional CSAs are generally based on a count of operating hours toward a full load design life of the covered hardware, the present invention describes systems and methods related to the variable pricing within service agreements that is based on power output load or level being generated by the covered engines. The contractual or pricing system and method, as well as the hardware related thereto, of the present invention (which, collectively, may be referred to herein simply as "pricing method" or "pricing system") is designed to make maintenance and service pricing within CSAs more equitable to the full load design life consumption based on the generating or output level of the plant or, more specifically, the generating unit. This is done by making the billing rate variable, such as with a tiered approach, and basing that variability according to a direct relationship to generating or output level, which, for example, may be measure in megawatt-hours. As will be seen, this better aligns the billing for expenditures related to maintenance and service with market or dispatch bidding practices and rate-based cost accounting.

For example, as already described, within competitive dispatch systems, marginal cost of operation generally prioritizes which power plants or generating units are selected to satisfy demand in electricity markets during a given generating period. By reducing marginal cost of maintenance and service at part load levels—instead of seeing those costs actually increase on a per MWh basis as happens in the case of conventional service contracts—the pricing methods and systems of the present invention provides power plant operators a market incentive in the dispatch bidding process. More specifically, within the context of present dispatch practices based on marginal operating costs, the present invention drives economics that increase the number of days the power plant or generating unit is dispatched as well as, within those days, allow the power plant or generating unit to come on-line earlier and stay on-line longer in part load conditions. As should be understood, being on-line and available for a power plant or generating unit—particularly in a part load capacity—can be a significant driver of revenue because those on-line units are the ones immediately available to satisfy unexpected spikes in demand. In this way, power plant owners or operators—the customer to the CSA agreement—may significantly increase plant revenue by increasing generating hours and the availability of the units. The service provider also benefits under this arrangement, even though, in the short term, the variable payments owed to the service provider may be less when based on output level instead of the conventional hours counting approach. This due to the way the present pricing system and method drives greater generating hours for the power plant over the course of the CSA, including instances where part load conditions result in full load opportunities because of unanticipated increases in demand. Additionally, the present invention may include, within the variable billing framework, certain safeguards for the service provider that can be used to limit the frequency or amount of part load generation available to customer under the variable pricing structure.

Figure 3:
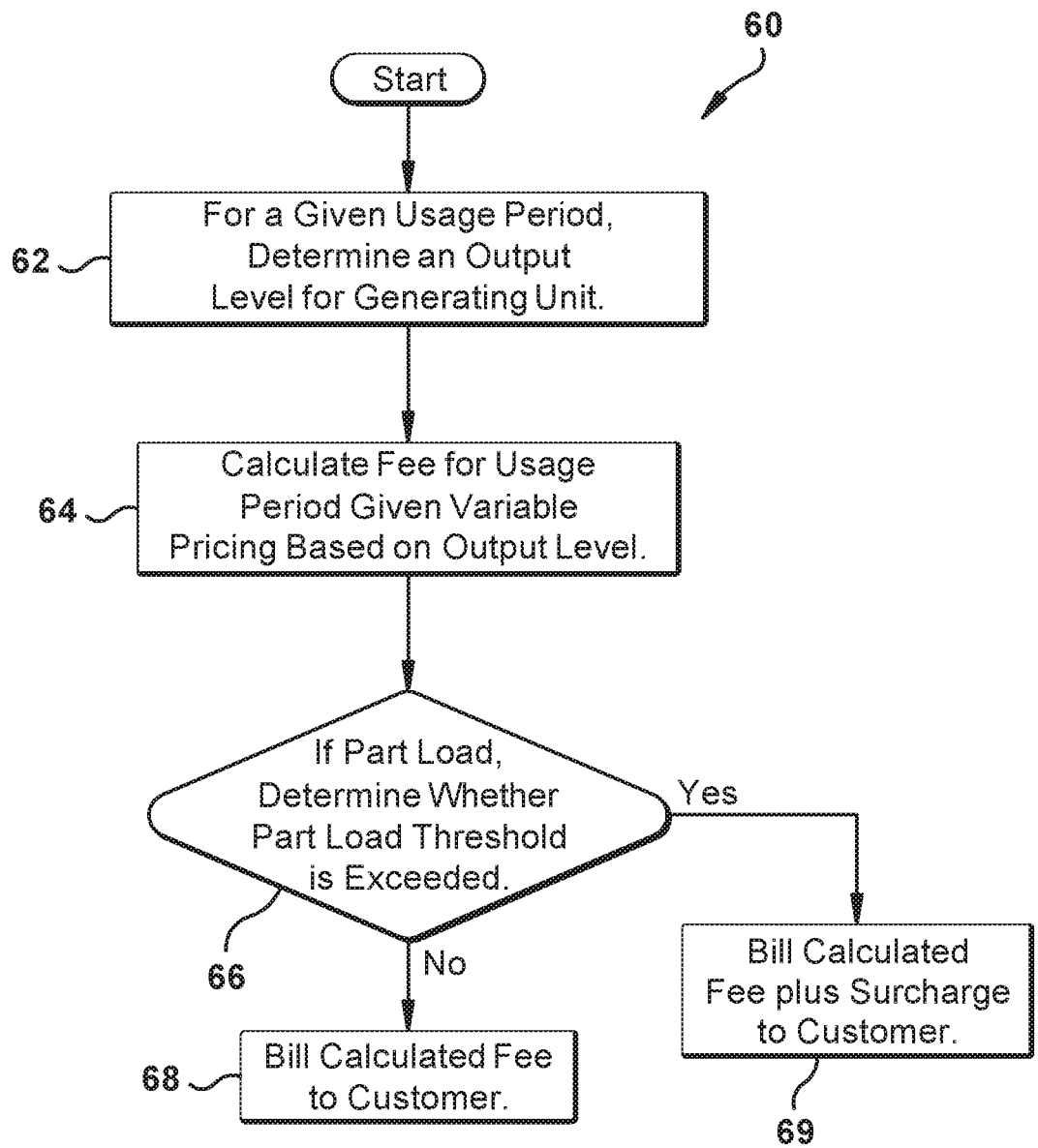
FIG. 3 shows a method in accordance with the present invention.

With reference now to FIG. 3, an exemplary embodiment of the present invention is shown, a method 60, that relates to variable pricing, as may be made part of contractual service agreements. As discussed more in relation to FIG. 6, the present method 60 may be implemented by a computer or computing system, networked devices, sensors, and other hardware, as one of ordinary skill in the art would understand. As already described, contractual service agreements or CSAs, are agreements between customers and service providers, where the service provider provides maintenance services on one or more power generating units for an agreed upon fee. For example, such the generating units may include thermal generating units, such as one or more gas turbines, steam turbines, or combine cycle power plants. Unless otherwise specifically limited, the present invention may be applicable to any type of generating unit, such as ones generating a measurable output and having maintenance and service aspects for which contractual service arrangements are possible. Thus, these other types of generating units may include, without limitation, renewables generating units, such as solar, wind, and hydro generating units, as well as, generating units having any types of internal combustion engine, including reciprocating, nuclear generating units, power storage or battery-enabled generating units, fuel cell generating units, and others. Such generating units may be operably connected to a generator for producing an output. As used herein, the "output" of a generating unit is defined as the electricity or output produced by the generator to which the generating unit is connected, which, for example, may be measured in megawatts. For the sake of clarity and brevity, the present method 60 will be discussed in relation to a single thermal generating unit, however, it should be appreciated that the present invention may be scaled to accommodate additional such generating units or power plants, as well as other types of generating units, as provided above.

According to exemplary embodiments of the present invention, the method 60 may commence at step 62 where an output level for a thermal generating unit is determined for a given usage period. The usage period, as used herein, is intended to refer to particular period of time and the operation of the thermal generating unit that occurs therein. The time frame of the usage period may be defined by the parties of the CSA, for example, to reflect a short market cycle. Alternatively, the usage period may be defined as a longer period of time, such as the regular billing periods that are defined over the course of the agreement. Thus, within step 62, the predefined usage period for the thermal generating unit is determined, which may include determining a starting time and an ending time for the usage period. This may be accomplished, for example, by recalling data stored within the memory of an implementing computer system relating to such usage periods.

As also part of step 62, the present method may include monitoring the output of the thermal generating unit over the course of the usage period and, from the results of such monitoring, designating the appropriate output level for the thermal generating unit for the usage period. Such monitoring, for example, may include receiving one or more measured values for the output of the thermal generating unit during the given usage period. Such measured values may be taken by remote sensors and received over a network connection. The one or more measured values for the output each may include an indication of mega-watts being generated by the generator attached to the thermal generating unit. The step of monitoring the output of the thermal generating unit may include providing a sensor that measures the output of the generator and configuring that sensor to take periodic measurements of the output of the generator. The measurements taken by the sensor then may be used to determine the appropriate output level for the usage period that is applicable to the thermal generating unit. The sensor for such measurements may be disposed at some point in the electrical circuit, such as, for example, between the output lugs of the generator to and including the interconnection or associated sub-station connecting the power plant into the local electricity grid.

At step 64, the present method 60 then may include calculating the fee that is payable or owed to the service provider for operation of the thermal generating unit during the usage period. According to exemplary embodiments, this fee is calculated pursuant to a variable pricing plan, where the variable pricing plan includes a price for calculating the fee that varies depending on the output level of thermal generating unit. In general, the variable pricing plan of the present invention includes a direct relationship between the price and the output level. That is, as the output level increases, the price (and thus the maintenance and service fee calculated from that price) generally increases, and, as the output level decreases, the price (and thus the maintenance and service fee calculated from that price) generally decreases. According to preferred embodiments, the variable pricing plan of the present invention includes a tiered plan having multiple pricing tiers, where each of the pricing tiers covers a range of output levels. Thus, as should be understood, each of these pricing tiers are defined by a particular price (which is used to calculate the maintenance and service fee), and a range of the output levels over which that particular price applies. The ranges of the output levels for the multiple pricing tiers may be sequential, non-overlapping, and continuous over a spectrum that includes a low or part load condition and an over-fire, peak-fire or, as used herein, over full load condition (i.e., an output that is higher than a rated or full load of the thermal generating unit). The relative pricing of the multiple pricing tiers may vary according to a direct relationship between the output level and the price. Thus, for example, the multiple pricing tiers may include a lower price at a part load condition, a middle price at a full load condition, and a higher price at an over full load condition. It should be understood that the pricing tiers of the present invention may be configured to cover any output level attainable by the generating unit. Further, as new technologies extend the range of achievable output levels for a given generating unit—such as, for example, lower turndown levels for overnight operation or higher over full load operation—the pricing tiers of the present invention may be adjusted to accommodate those levels.

For the sake of a simplified example, the multiple pricing tiers may include a first pricing tier and second pricing tier, where the range of output levels included within the first pricing tier is lower than the range of output levels included within the second pricing tier. In such a case—due to the direct relationship between output level and price of maintenance and service fees—the price of the first pricing tier is lower than the price of the second pricing tier. Thus, according to an exemplary operation of the present method, the step of calculating the fee per the variable pricing plan results in a decision being made that the price of the first pricing tier is applicable (i.e., because the output level of the usage period falls within the range of output levels covered by the first pricing tier). In this case, the price associated with the first pricing tier would then be used to calculate the fee for the usage period that then becomes payable to the service provider. Alternatively, according to an alternative example of operation, the step of calculating the fee per the variable pricing plan results in a decision being made that the price of the second pricing tier is applicable (i.e., because the output level of the usage period falls within the range of output levels covered by the second pricing tier). In this case, the price associated with the second pricing tier would then be used to calculate the fee for the usage period that then becomes payable to the service provider. As should be understood, more pricing tiers may be included, such as, preferably, between 3 and 8.

As already indicated, one or more of the pricing tiers of the present invention may cover output levels that represent part load conditions for the thermal generating unit. Given the direct relationship between output level and price of the variable pricing plan, such part load conditions result in reducing the maintenance and service costs of part load operation for the customer. This, of course, makes the customer's dispatch bids for generating at part load levels more competitive and increases the likelihood that the customer's power plants will operate at part load conditions more often. As intended, this result may be advantageous to both the customer power plant and the service provider. However, it should be understood that, if customers choose to generate almost exclusively at part load conditions over the course of the CSA, service providers may be exposed to unfavorable economic outcomes. Thus, it may be desirable for the service provider to cap the amount of time at which the covered thermal generating units is allowed to operate at part load levels and still receive the reduced maintenance and service fees meant for those levels under the variable pricing plan. Therefore, as represented by step 66, the present method 60 may include functionality by which the amount of part load generation available to the customer over a given time frame is capped.

To explain how this capping is accomplished, it should be understood that, as used thus far, the term "usage period" generally refers to a current usage period. As used herein, those usage periods occurring before the current usage period will be referred to as "previous usage periods". With that understanding, at step 66, the present invention includes determining whether a maximum amount of part load operation has already been exceeded within a relevant or predetermined time frame. This determination may be done by referring to one or more stored records that indicate the manner in which the thermal generating unit was operated during the previous usage periods that are relevant given the predetermined time frame. Thus, the present method may include calculating a cumulative time that the thermal generating unit was operated at a part load condition during those previous usage periods. This calculation may be made by recalling the output levels for the unit for those previous usage periods, determining which of those output levels represent part load conditions, and then summing those representing part load conditions to arrive at a total. Once this is cumulative time of part load operation is determined, the present method may include determining if it exceeds a predetermined threshold or maximum, which may be defined within the CSA.

As part of the present method 60, a surcharge may be conditionally added to the price of a part load pricing tier based on whether the cumulative part load operation exceeds the predetermined threshold. More specifically, a surcharge may be added or assessed to the price of the part load pricing tier for the current usage period if the cumulative part load operation is found to exceed the predetermined threshold. If, on the other hand, the cumulative part load operation is found not to exceed the predetermined threshold, the surcharge is not assessed. According to preferred embodiments, the amount of the surcharge may be made such that the price is increased so that it now equals the price of a pricing tier that corresponds to full load operation. That is, the amount of the surcharge may be configured so that the surcharge plus the price of the part-load pricing tier is equal to the price of the pricing tier that corresponds to a full load output level for thermal generating unit. It should be appreciated that step 66 may be skipped—and the method 60 proceed directly to step 68—if the output level for the current usage period is found to be full load or over full load conditions (i.e., found not to be a part load condition).

The method 60 may end at steps 68 and 69 where the customer is billed in accordance with the calculated fee (step 68) or the calculated fee plus the surcharge (step 69). According to exemplary embodiments, the step of billing the fee to the customer may include a computer generated an electronic notification that includes the calculated maintenance and service fee as well as the usage period to which the calculated fee applies. The method may further include electronically transmitting the electronic notification to the customer.

Figure 4:
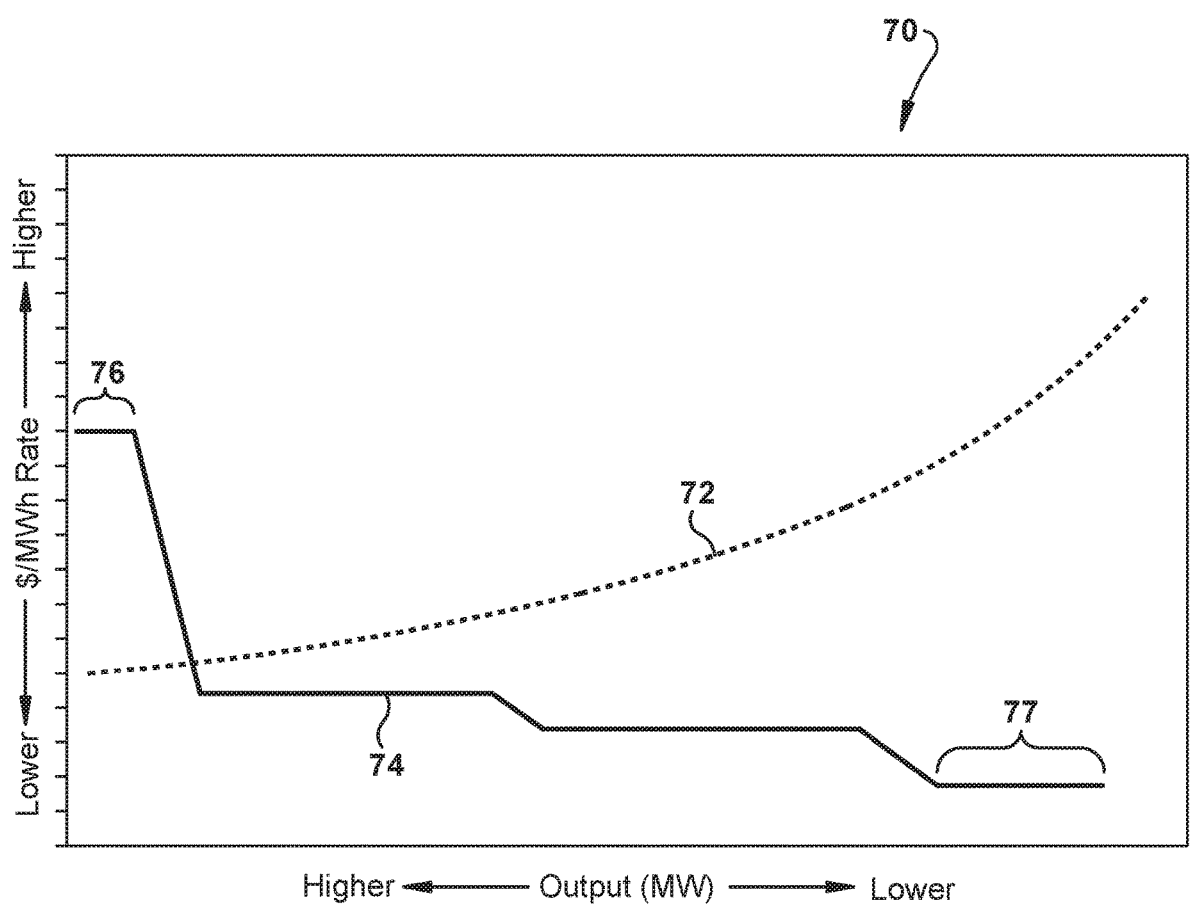
FIG. 4 illustrates an exemplary plot of conventional pricing versus the variable pricing of the present invention.

With reference now to FIG. 4, an exemplary plot 70 is illustrated that compares conventional pricing 70 against an example of the tiered pricing 74 of the present invention. As shown, with conventional pricing 70, as the output (represented on the x-axis in megawatts) of the generating unit is reduced, the cost or "price" maintenance and service (represented on the Y-axis in $/megawatt-hours) increases. In contrast, the tiered pricing 74 of the present invention includes four separate tiers by which the price of maintenance and service under the CSA actually "steps down" from a high level 76—that covers a high-end range of output levels in MW—to a low level 77—that covers a low-end range of output levels. In this way, the marginal cost of maintenance and service is reduced so that—instead of seeing those costs actually increase on a per MWh basis as happens in the case of conventional pricing—the pricing methods and systems of the present invention reduces the marginal cost of maintenance and service at part load generating conditions.

Figure 5:
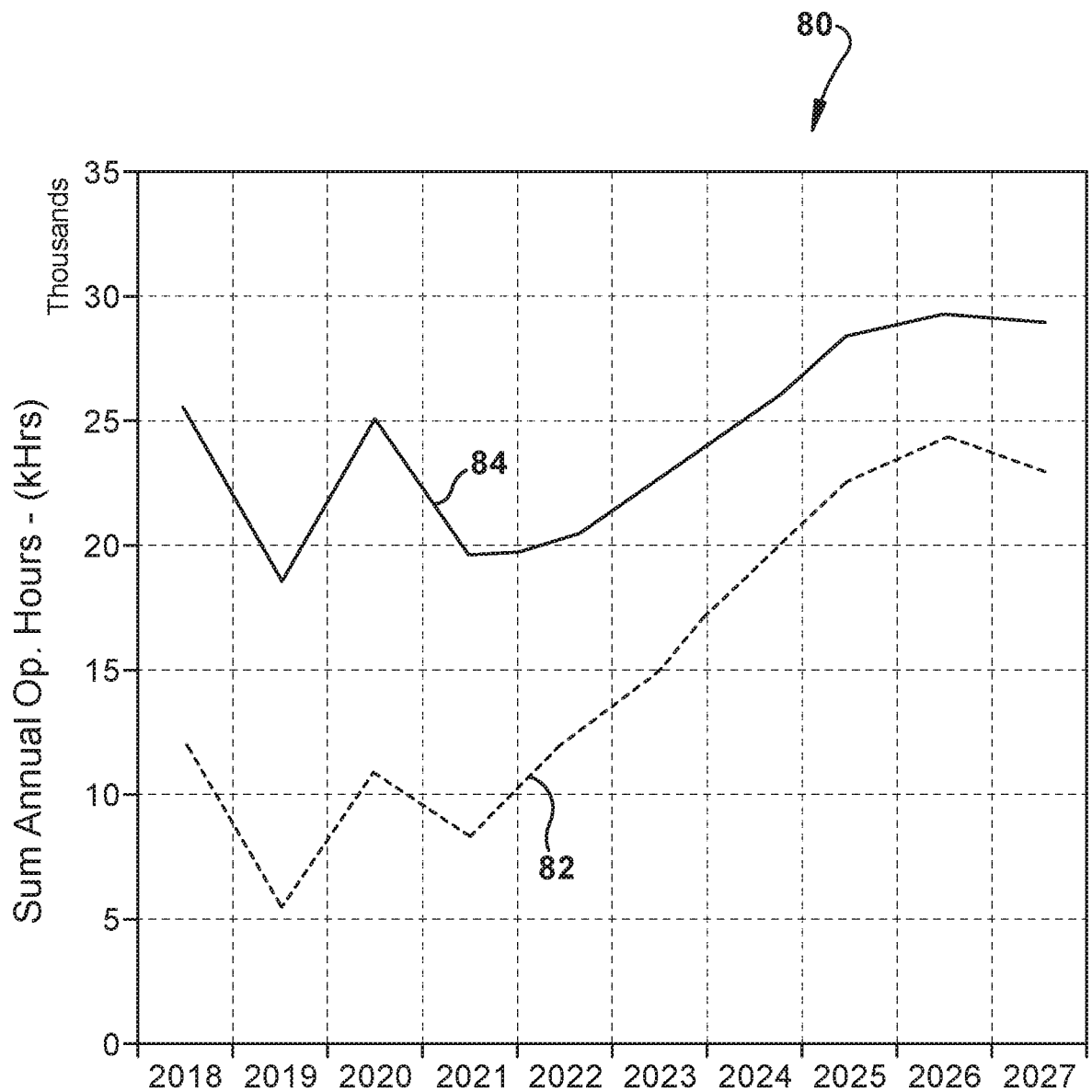
FIG. 5 illustrates an exemplary plot of operating hours data and projections in accordance with aspects of the present invention.

As indicated in the exemplary plot 80 of FIG. 5, the pricing methods and systems of the present invention may provide a competitive edge in the bidding process that significantly impacts the number of operating hours dispatched to a generating unit over the long term. As shown, the total sum of annual operating hours has been projected forward in accordance with a dispatching model that is based on past dispatch practices and results. Specifically, the total sum of annual operating hours is projected for: 1) a first case 82 in which the bids are assembled with maintenance and service costs per a conventional pricing scheme (such as the one shown in pricing curve 72 of FIG. 4); and 2) a second case 84 in which the bids include the variable pricing of the present invention (such as the tiered pricing 74 of FIG. 4). As shown, the projected sum of annual operating hours increases dramatically from the first "conventionally priced" case 82 and the second "variably priced per output" case 84. As already discussed, this result is due to present dispatch practices being based on marginal operating costs and the manner in which the variable pricing of the present invention better aligns with these dispatch practices. Thus, the number of days the power plant or generating unit is dispatched increases dramatically, as well as, within those days, the power plant or generating unit is allowed to come on-line earlier and stay on-line longer in those part load conditions. Additionally, being thus on-line and available can lead to additional revenue because such available units are the ones used to satisfy unexpected spikes in demand. In this way, the power plant owner or operator may significantly increase revenue. And, over the long term, the service provider also benefits due to the significant increase in operating hours and the resulting increase in required maintenance and service. That is, more operating hours provides more revenue for both the customer and the service provider.

Figure 6:
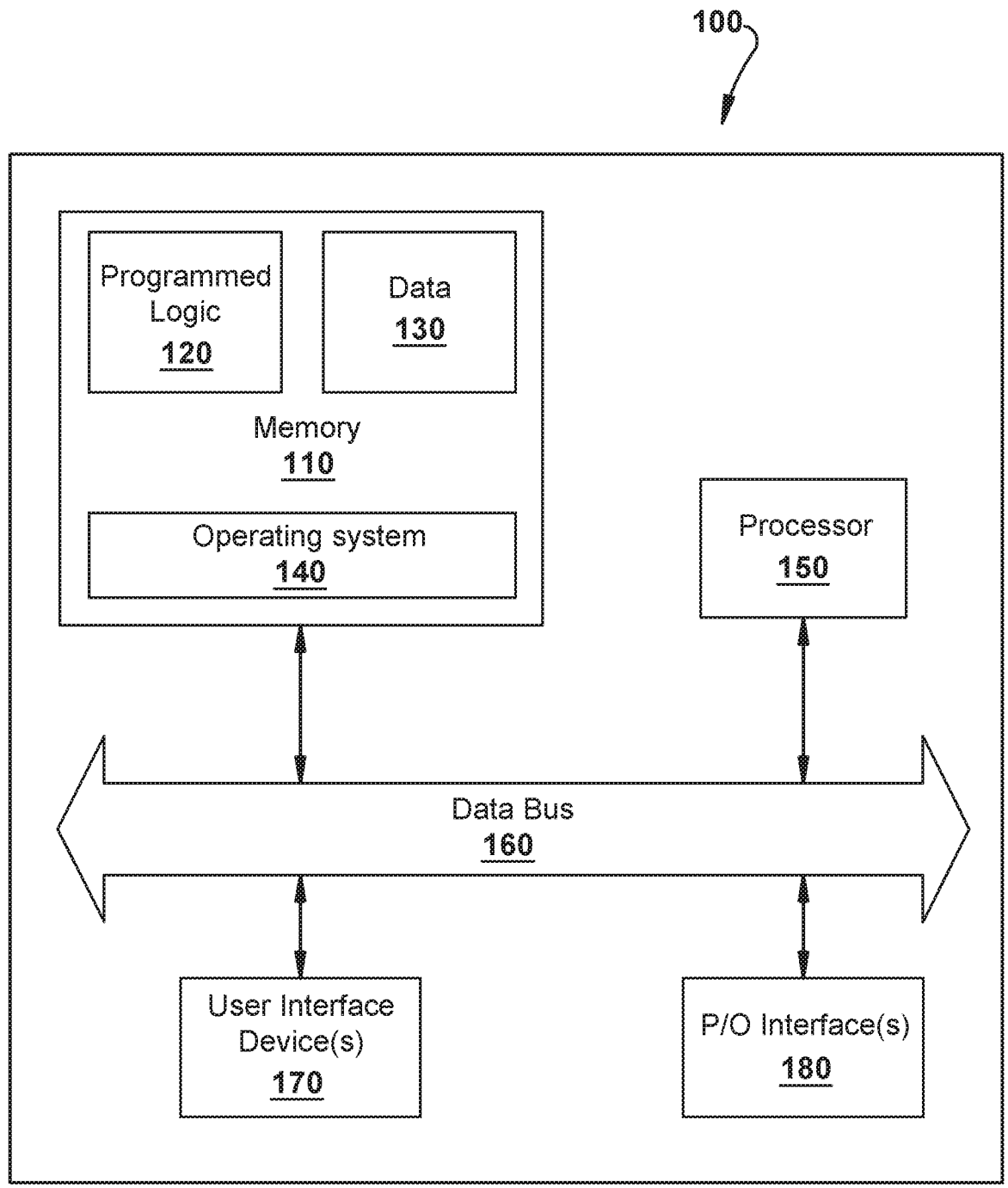
FIG. 6 depicts a schematic diagram illustrating an example computer system for performing any one or more of the methods discussed herein.

FIG. 6 depicts a schematic diagram illustrating an example computer system 100 for performing any one or more of the methods discussed herein, in accordance with various embodiments of the present invention. More specifically, elements of the computer system 100 may be used to implement the pricing systems and methods related contractual service agreements. The computer system 100 may include a memory 110 that stores programmed logic 120 (e.g., software) and data 130. The memory 110 also may include an operating system 140. A processor 150 may utilize the operating system 140 to execute the programmed logic 120, and in doing so, may also utilize the data 130. A data bus 160 may provide communication between the memory 110 and the processor 150. Users may interface with the computer system 100 via at least one user interface device 170, such as a keyboard, mouse, touchscreen, gesture control device, wearable computer, control panel, or any other device capable of communicating data to and from the computer system 100. The computer system 100 may be in communication with customer equipment and its associated devices online, including sensors or data recorded from such sensors, while operating, as well as in communication with the customer equipment and its associated devices offline while not operating, via an input/output (I/O) interface 180. More specifically, the computer system 100 may carry out the execution of model-based instructions for, but not limited to, providing command signals to certain devices of the customer equipment and/or its associated devices, as provided herein. The computer system 100 and the programmed logic 120 implemented thereby may include software, hardware, firmware, or any combination thereof. It should also be appreciated that multiple controllers or processors may be used in the computer system 100, whereby different features described herein may be executed on one or more different controllers or processors.

Accordingly, embodiments described herein facilitate systems and methods for variable pricing or billing practices related to contractual service agreements. References are made to block diagrams of systems, methods, apparatuses, and computer program products according to example embodiments. It will be understood that at least some of the blocks of the block diagrams, and combinations of blocks in the block diagrams, respectively, may be implemented at least partially by computer program instructions. These computer program instructions may be loaded onto a general purpose computer, special purpose computer, special purpose hardware-based computer, or other programmable data processing apparatus to produce a machine, such that the instructions, which execute on the computer or other programmable data processing apparatus, create means for implementing the functionality of at least some of the blocks of the block diagrams, or combinations of blocks in the block diagrams discussed. The computer program instructions mentioned herein may also be stored in a computer-readable memory that can direct a computer or other programmable data processing apparatus to function in a particular manner, such that the instructions stored in the computer-readable memory produce an article of manufacture including instruction means that implement the function specified in the block or blocks. The computer program instructions may also be loaded onto a computer or other programmable data processing apparatus to cause a series of operational steps to be performed on the computer or other programmable apparatus to produce a computer implemented process, such that the instructions that execute on the computer or other programmable apparatus provide steps for implementing the functions specified in the block or blocks. One or more components of the systems and one or more elements of the methods described herein may be implemented through an application program running on an operating system of a computer. They also may be practiced with other computer system configurations, including hand-held devices, multiprocessor systems, microprocessor based or programmable consumer electronics, mini-computers, mainframe computers, and so forth.

As one of ordinary skill in the art will appreciate, the many varying features and configurations described above in relation to the several exemplary embodiments may be further selectively applied to form the other possible embodiments of the present invention. For the sake of brevity and taking into account the abilities of one of ordinary skill in the art, all the possible iterations is not provided or discussed in detail, though all combinations and possible embodiments embraced by the several claims below or otherwise are intended to be part of the present application. In addition, from the above description of several exemplary embodiments of the invention, those skilled in the art will perceive improvements, changes and modifications. Such improvements, changes and modifications within the skill of the art are also intended to be covered by the appended claims. Further, it should be apparent that the foregoing relates only to the described embodiments of the present application and that numerous changes and modifications may be made herein without departing from the spirit and scope of the application as defined by the following claims and the equivalents thereof.

That which is claimed:

1. A computer-implemented method for improving operations of a generating unit in a part load capacity, wherein an output of the generating unit is produced by a generator to which the generating unit operably connects, the method comprising the steps of:

obtaining from a computer system memory a usage period for the generating unit for which an equipment consumption rate for operating the generating unit is to be determined;

monitoring the output of the generating unit during the usage period using one or more sensors coupled to the generating unit and, therefrom, calculating an output level for the generating unit for the usage period, wherein the output level includes a total amount of power generated by the generating unit during the usage period;

providing a tiered function that defines tiers as a function of output level, wherein at least one of the tiers is associated with a part load output level;

analyzing previous usage period data from a data resource to determine a part load threshold value, wherein the part load threshold value is based on an amount of time the generating unit operated at a part load during previous usage periods;

determining the equipment consumption rate for the usage period using an applicable tier from the tiered function in which the output level dictates the applicable tier;

in response to the applicable tier being associated with the part load output level, determining if the output level exceeds the part load threshold value and applying a capped amount of hours at which the generating unit is allowed to operate at the part load output level; and in response to the output level exceeding the part load threshold value, increasing the equipment consumption rate for operating the generating unit at the part load output level, wherein the generating unit has an increased number of days available for dispatching and operating in the part load capacity, and wherein within the days available for dispatching, operating hours at the part load output level of the generating unit is increased up to the capped amount of hours.

2. The method according to claim 1,
wherein the generating unit comprises at least one of: a gas turbine; a steam turbine; and a combine cycle power plant that includes both a gas turbine and a steam turbine.

3. The method according to claim 1, wherein the tiers are sequential, continuous, and non-overlapping over a spectrum of potential output levels of the generating unit.

4. The method according to claim 1, wherein the output level of a first tier comprises a part load generating condition of the generating unit.

5. The method according to claim 4, wherein the usage period comprises a current usage period, and usage periods occurring prior to the current usage period are designated previous usage periods;

further comprising the steps of:

based on the output level from one or more of the previous usage periods, calculating a cumulative time that the output level of the generating unit comprises the part load generating condition of the first tier;

determining if the cumulative time of the part load generating condition exceeds a predetermined threshold; and conditionally assessing a surcharge to the first tier for the current usage period depending on whether the cumulative time exceeds the predetermined threshold.

6. The method according to claim 5, wherein the step of conditionally assessing the surcharge to the first tier for the current usage period depending on whether the cumulative time exceeds the predetermined threshold includes:

assessing the surcharge of the first tier for the current usage period when the cumulative time exceeds the predetermined threshold; and not assessing the surcharge to the first tier for the current usage period when the cumulative time does not exceed the predetermined threshold.

7. The method according to claim 6, wherein the amount of the surcharge is configured so that the surcharge plus the equipment consumption rate of the first tier is equal to the equipment consumption rate of a tier that includes the output level that corresponds to a full load of the generating unit.

8. The method according to claim 1, wherein the step of monitoring the output of the generating unit during the usage period to determine the output level for the usage period comprises receiving one or more measured values for the output of the generating unit during the usage period; and wherein the one or more measured values for the output of the generating unit each comprises an indication of megawatts being generated by the generator.

9. The method according to claim 1, wherein the step of monitoring the output of the generating unit during the usage period to determine the output level for the usage period comprises:

providing a sensor for measuring the output of the generator;

taking measurements with the sensor of the output of the generator during the usage period; and using the measurements taken by the sensor to determine the output level for the usage period.

10. The method according to claim 1, wherein a range of output levels included within a first tier includes a part load condition for the generating unit;

a range of output levels included within a second tier includes a full load condition for the generating unit; and a range of output levels included within a third tier includes an over full load condition for the generating unit.

11. A system for improving operations of a generating unit in a part load capacity, wherein an output of the generating unit is produced by a generator to which the generating unit operably connects, the system comprising:

one or more hardware processors; and a machine-readable storage medium on which is stored instructions that cause the one or more hardware processors to execute a method that includes:

determining a usage period for the generating unit for which an equipment consumption rate for operating the generating unit is to be determined;

monitoring the output of the generating unit during the usage period using one or more sensors coupled to the generating unit and, therefrom, calculating an output level for the generating unit for the usage period, wherein the output level includes a total amount of power generated by the generating unit during the usage period;

providing a tiered function that defines tiers as a function of output level, wherein at least one of the tiers is associated with a part load output level;

analyzing previous usage period data from a data resource to determine a part load threshold value, wherein the part load threshold value is based on an amount of time the generating unit operated at a part load during previous usage periods;

determining the equipment consumption rate for the usage period using an applicable tier from the tiered function in which the output level dictates the applicable tier;

in response to the applicable tier being associated with the part load output level, determining if the output level exceeds the part load threshold value and applying a capped amount of hours at which the generating unit is allowed to operate at the part load output level; and in response to the output level exceeding the part load threshold value, increasing the equipment consumption rate for operating the generating unit operates at the part load output level, wherein the generating unit has an increased number of days available for dispatching and operating in the part load capacity, and wherein within the days available for dispatching, operating hours at the part load output level of the generating unit is increased up to the capped amount of hours.

12. The system according to claim 11, wherein the generating unit comprises at least one of: a gas turbine; a steam turbine; a combine cycle power plant that includes both a gas turbine and a steam turbine; a solar generating unit; a wind turbine; a hydro-electric generating unit; and a reciprocating internal combustion engine.

* * * * *